United States Patent [19]
Turner

[11] Patent Number: 6,010,672
[45] Date of Patent: Jan. 4, 2000

[54] PROCESS FOR PRODUCING SODIUM CARBONATE FROM TRONA ORE

[75] Inventor: Allan L. Turner, Lakewood, Colo.

[73] Assignee: Environmental Projects, Inc., Casper, Wyo.

[21] Appl. No.: 09/061,363

[22] Filed: Apr. 15, 1998

Related U.S. Application Data

[60] Provisional application No. 60/043,111, Apr. 17, 1997.

[51] Int. Cl.[7] ............... C01D 7/00; C22B 26/00
[52] U.S. Cl. ................... 423/206.2; 423/421
[58] Field of Search ................ 423/206.2, 421, 423/184, 195, 196; 23/302 T

[56] References Cited

U.S. PATENT DOCUMENTS

| | | | |
|---|---|---|---|
| 2,887,360 | 5/1959 | Hoekje | 23/63 |
| 3,260,567 | 7/1966 | Hellmers et al. | 423/206.2 |
| 3,264,057 | 8/1966 | Miller | 423/206.2 |
| 3,273,958 | 9/1966 | Peverley | 423/206.2 |
| 3,455,647 | 7/1969 | Gloster | 423/206.2 |
| 3,498,744 | 3/1970 | Frint et al. | 23/63 |
| 3,655,331 | 4/1972 | Seglin et al. | 23/63 |
| 4,183,901 | 1/1980 | Ilardi et al. | 423/206.2 |
| 5,624,647 | 4/1997 | Zolotoochin et al. | 423/206.2 |

*Primary Examiner*—Steven Bos
*Attorney, Agent, or Firm*—Sheridan Ross P.C.

[57] ABSTRACT

Disclosed is a process for the production of sodium carbonate monohydrate crystals from uncalcined trona ore. The process include contacting trona ore with a saturated sodium carbonate solution at a temperature of at least about 117° C. to form a brine solution comprising anhydrous sodium carbonate crystals. The temperature of the brine solution is reduced to form sodium carbonate monohydrate crystals and the crystals are separated from the brine solution. The process can include maintaining the concentration of bicarbonate in the brine solution at a low level to promote the formation of only anhydrous sodium carbonate at temperatures above about 117° C. and to promote the formation of sodium carbonate monohydrate at temperatures below about 109° C.

20 Claims, No Drawings

PROCESS FOR PRODUCING SODIUM CARBONATE FROM TRONA ORE

CROSS REFERENCE TO RELATED APPLICATIONS

The present application claims priority from U.S. Provisional Application Ser. No. 60/043,111, filed Apr. 17, 1997.

FIELD OF THE INVENTION

The present invention relates to the production of sodium carbonate monohydrate crystals from uncalcined trona ore.

BACKGROUND OF THE INVENTION

Many saline minerals are recognized as being commercially valuable. For example, trona, borates, potash and sodium chloride are mined commercially. After mining, these minerals typically need to be beneficiated to remove naturally occurring impurities.

With regard to trona ($Na_2CO_3 \cdot NaHCO_3 \cdot 2H_2O$), high-purity trona is commonly used to make soda ash, which is used in the production of glass and paper. Naturally-occurring trona, or crude trona, is found in large deposits in the western United States, such as in Wyoming and California, and also in Egypt, Kenya, Botswana, Tibet, Venezuela and Turkey. Crude trona ore from Wyoming is typically between about 80% and about 94% trona, with the remaining components including shortite, halite, quartz, dolomite, mudstone, oil shale, kerogen, mica, nahcolite and clay minerals.

The glass and paper making industries generally require soda ash produced from trona having a purity of 99% or more. In order to obtain such a high purity, beneficiation processes including dissolution and recrystallization have been used. For example, crude trona can be calcined to yield anhydrous sodium carbonate, which is then solubilized, treated to remove impurities, crystallized and dried to produce sodium carbonate monohydrate. Calcination of trona produces both gas and particulate pollutants which are released into the atmosphere.

Other wet beneficiation processes, such as those disclosed in U.S. Pat. No. 5,396,863 and U.S. Pat. No. 2,887,360, disclose methods and/or apparatus for treating non-trona forms of sodium carbonate. For example, U.S. Pat. No. 5,396,863 discloses a method for treating non-trona forms of sodium carbonate by a densification process. In this regard, U.S. Pat. No. 5,396,863 is suitable for the production of dense anhydrous sodium carbonate (usually referred to as dense soda) from light anhydrous sodium carbonate (usually referred to as light soda). U.S. Pat. No. 2,887,360 discloses purification of impure sodium carbonate, such as from the ammonia-soda process, which is contaminated with an impurity, such as boron compounds, silica compounds and/or sulfates. This process includes introducing sodium carbonate to a super-saturated slurry, heating the slurry above the transition temperature (about 112° CC) to anhydrous sodium carbonate and cooling to form monohydrate sodium carbonate crystals. Solids are then removed from the slurry to separate the crystals from soluble impurities.

SUMMARY OF THE INVENTION

The present invention provides a process for producing sodium carbonate monohydrate crystals from trona ore by contacting the trona ore with a saturated sodium carbonate solution at a temperature of at least about 117° C. to form a saturated sodium carbonate-sodium bicarbonate brine solution comprising anhydrous sodium carbonate crystals. The temperature of the brine solution is then reduced to form sodium carbonate monohydrate crystals, which are recovered.

A further embodiment of the present invention includes comminuting the trona ore to less than about 100 mesh (Tyler) prior to contacting it with a saturated sodium carbonate solution. In addition, the brine solution is partially separated to remove a portion of a liquid from the brine solution. The solids-containing portion is then mixed with a second saturated sodium carbonate solution and cooled to form sodium carbonate monohydrate crystals. In further embodiments, the second saturated sodium carbonate solution has a lower concentration of sodium bicarbonate than the brine solution, and the separated sodium carbonate monohydrate crystals can be dried to provide anhydrous sodium carbonate crystals.

DETAILED DESCRIPTION OF THE INVENTION

The present invention is directed to processes for the production of sodium carbonate from trona. In particular, processes of the present invention provide purification of trona without calcination (i.e., without thermal decomposition of trona to anhydrous sodium carbonate). The present invention is particularly well adapted for use with feedstreams having high contents of insoluble impurities. For example, the present invention is suitable for use with feedstreams having greater than about 0% by weight insoluble impurities, more particularly greater than about 15% by weight insoluble impurities, and even more particularly greater than about 30% by weight insoluble impurities.

The purity of trona depends on the deposit location, as well as on the area mined at a particular deposit. In addition, the mining technique used can significantly affect the purity of trona. For example, by selective mining, higher purities of trona ore can be achieved. Deposits of trona ore are located at several locations throughout the world, including Wyoming (Green River Formation), California (Searles Lake), Egypt, Kenya, Venezuela, Botswana, Tibet and Turkey (Beypazari Basin). For example, a sample of trona ore from Searles Lake has been found to have between about 50% and about 90% by weight (wt. %) trona and a sample taken from the Green River Formation in Wyoming has been found to have between about 80 and about 94 wt. % trona. The remaining 6 to 20 wt. % of the ore in the Green River Formation sample comprised impurities including shortite (1–5 wt. %) and halite, and the bulk of the remainder comprises shale consisting predominantly of dolomite, clay, quartz, kerogen and iron, and traces of other impurities. Other samples of trona ore can include different percentages of trona and impurities, as well as include other impurities.

Processes of the present invention involve mixing trona ore with a saturated sodium carbonate solution at a temperature of at least about 109° C. to form a saturated sodium carbonate brine solution, more preferably at a temperature of at least about 117° C., and most preferably at a temperature of at least about 150° C. It will be appreciated that this step must be conducted at above atmospheric pressures. Trona ore and the saturated sodium carbonate solution can be mixed at atmospheric pressure and transferred into a vessel having a desired temperature at increased pressure. Alternatively, trona ore and the saturated sodium carbonate solution can be fed directly into the vessel at a desired temperature and pressure. At a temperature of at least about 117° C., solids in the brine solution include anhydrous sodium carbonate crystals and insoluble materials originally present in the trona. Preferably, the trona ore is comminuted to a particle size of less than about 100 mesh (Tyler) prior to being mixed with the saturated sodium carbonate solution, more preferably to a particle size of between about 100 mesh and 250 mesh. Thus, in addition to the trona ore being reduced in particle size, any insoluble impurities will also be reduced in size.

Processes of the present invention are preferably conducted such that the only solids in the brine solution are anhydrous sodium carbonate crystals and any insoluble materials. In this regard, the saturated brine solution contains a low amount of bicarbonate (e.g., sodium bicarbonate). Examination of a phase diagram shows that the area representing the sodium carbonate solid phase becomes relatively large at temperatures of greater than about 117° C. By maintaining the sodium bicarbonate concentrations in accordance with the disclosure herein, the only solid phase will be anhydrous sodium carbonate. Preferably, the amount of bicarbonate in solution is less than about 9.4 wt %, and more preferably less than about 9 wt %. One technique for controlling the bicarbonate concentration is to limit the bicarbonate added to the solution with the trona ore by controlling the ratio of the saturated brine solution to the trona ore. In this manner, the composition of the resulting brine solution leads to a formation of only anhydrous sodium carbonate crystals at a temperature of above about 117° C. and to a formation of only sodium carbonate monohydrate crystals at a temperature of less than about 109° C. Suitable specific ratios can be determined by utilizing published phase diagrams which can be found in the literature, including *J. Am. Chem. Soc.,* 1927, 49, 2487 and *J. Am. Chem. Soc.,* 1934, 55, 43.

Processes of the present invention further include reducing the temperature of the brine solution to less than about 150° C. to form sodium carbonate monohydrate crystals, more preferably to less than about 117° C., and most preferably to less than about 109° C. As is well-recognized, 37° C. is the lower end of the monohydrate temperature range, and therefore, specific temperature ranges can be formed between 37° C. and the various upper limits identified above. One of the advantages of reducing the temperature of the brine solution is that it promotes formation of sodium carbonate monohydrate. Sodium carbonate monohydrate crystals have the advantage, compared to anhydrous crystals, of being easier to grow to a large crystal size. Therefore, recovery of crystals from smaller insoluble material on a size separation basis is facilitated. In addition, handling problems associated with hydration of the anhydrous sodium carbonate during recovery and with removal of solids from a pressurized system, as is required at higher temperatures, are avoided.

Processes of the invention also include separating sodium carbonate monohydrate crystals from the brine solution and insoluble impurities using known separation techniques such as filtration or the use of a hydrocyclone. For example, the crystal size of sodium carbonate monohydrate can be controlled to yield relatively large crystals which can be size-separated from insoluble materials. For example, sodium carbonate monohydrate crystals in the 20–100 mesh size range can be produced. The separated sodium carbonate monohydrate crystals can be used directly or they can be dehydrated (i.e., dried) using known techniques to provide anhydrous sodium carbonate.

In an alternative embodiment, the present invention can also include separating a substantial portion of the liquid from the brine solution to concentrate the solids. The resulting concentrated brine solution containing anhydrous sodium carbonate preferably contains at least about 40% solids, more preferably at least about 60% solids and most preferably at least about 65% solids. The brine solution can then be diluted with a second saturated sodium carbonate solution and the temperature is reduced to less than about 117° C., preferably less than about 109° C. Again, the ratio of the brine solution and the second saturated sodium carbonate solution to the trona ore is selected such that the composition of the resulting brine solution results in formation of only anhydrous sodium carbonate crystals at a temperature of above about 117° C. and in formation of only sodium carbonate monohydrate crystals at a temperature of less than about 109° C.

It should be appreciated that as the temperature of solution is reduced, some flashing of water and carbon dioxide can occur, in which case, without the re-addition of these components, the brine solution will have a slightly more concentrated composition.

The liquid portion which is separated in the embodiment referenced above to concentrate solids will also include a significant amount of insoluble impurities. This mixture of insoluble impurities and brine can be further subjected to a separation process to remove the insoluble materials from the liquid portion. For example, the separation can include filtration, settling or other solid/liquid separation techniques. In the various embodiments of this invention, the separated brine solution and the separated liquid portion will typically contain a large amount of sodium carbonate and sodium bicarbonate. By removing carbon dioxide from such solutions using any known technique, such as direct heating, indirect heating or steam stripping, the amount of sodium bicarbonate in the liquid portion and/or the separated brine solution can be reduced to provide a recycle solution which has a lower concentration of sodium bicarbonate than the liquid portion and/or the brine solution. The efficiency of removal of $CO_2$ is more efficient at higher temperatures. Therefore, the removal of $CO_2$ is typically conducted at temperatures above about 90° C., and more preferably above about 100° C. The recycle solution can then be used as a part of the saturated sodium carbonate solution and/or the second saturated sodium carbonate solution.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiment described hereinabove is further intended to explain the best mode known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A process for producing sodium carbonate monohydrate crystals from trona ore comprising the steps of:

(a) contacting said trona ore with a saturated sodium carbonate solution at a temperature of at least about 117° C. to form a saturated sodium carbonate brine solution comprising anhydrous sodium carbonate crystals;

(b) reducing the temperature of said brine solution to form sodium carbonate monohydrate crystals; and (c) separating at least a portion of said sodium carbonate monohydrate crystals from said brine solution.

2. The process of claim 1 further comprising comminuting said trona ore.

3. The process of claim 2, wherein said comminuted trona ore has a particle size of less than about 100 mesh (Tyler).

4. The process of claim 1, further comprising the step of separating at least a portion of a liquid from said brine solution.

5. The process of claim 4, further comprising adding a second saturated sodium carbonate solution to said brine solution.

6. The process of claim 5, wherein said second saturated sodium carbonate solution comprises a lower sodium bicarbonate concentration than said brine solution.

7. The process of claim 4, further comprising a step selected from the group consisting of separating insoluble impurities from said liquid portion and separating insoluble impurities from said brine solution.

8. The process of claim 7, further comprising a step selected from the group consisting of removing carbon dioxide from said liquid portion to provide a recycle solution and removing carbon dioxide from said brine solution to provide a recycle solution.

9. The process of claim 8, wherein said removal of carbon dioxide comprises steam stripping.

10. The process of claim 8, wherein said saturated sodium carbonate solution comprises said recycle solution.

11. The process of claim 1, further comprising the step of drying said sodium carbonate monohydrate crystals.

12. A process for producing sodium carbonate monohydrate crystals from trona ore comprising the steps of:
   (a) comminuting said trona ore to less than about 100 mesh (Tyler);
   (b) contacting said trona ore with a saturated sodium carbonate solution at a temperature of at least about 117° C. to form a saturated sodium carbonate brine solution comprising anhydrous sodium carbonate crystals;
   (c) separating a portion of a liquid from said brine solution;
   (d) adding a second saturated sodium carbonate solution to said brine solution;
   (e) reducing the temperature of said brine solution to form sodium carbonate monohydrate crystals; and
   (f) separating at least a portion of said sodium carbonate monohydrate crystals from said brine solution.

13. The process of claim 12, further comprising a step selected from the group consisting of separating insoluble impurities from said liquid portion and separating insoluble impurities from said brine solution.

14. The process of claim 13, further comprising a step selected from the group consisting of removing carbon dioxide from said liquid portion to provide a recycle solution and removing carbon dioxide from said brine solution to provide a recycle solution.

15. The process of claim 14, wherein said recycle solution comprises a solution selected from the group consisting of said saturated sodium carbonate solution and said second saturated sodium carbonate solution.

16. The process of claim 15, wherein said recycle solution comprises lower sodium bicarbonate concentration than said brine solution.

17. The process of claim 12, further comprising the step of drying said sodium carbonate monohydrate crystals.

18. A process for producing anhydrous sodium carbonate crystals from trona ore comprising:
   (a) comminuting said trona ore to a particle size of less than about 100 mesh (Tyler);
   (b) contacting said trona ore with a saturated sodium carbonate solution at a temperature of at least about 117° C. to form a saturated sodium carbonate brine solution comprising anhydrous sodium carbonate crystals;
   (c) separating at least a portion of a liquid from said brine solution;
   (d) adding a second saturated sodium carbonate solution to said brine solution, wherein said second saturated sodium carbonate solution comprises lower sodium bicarbonate concentration than said brine solution;
   (e) reducing the temperature of said brine solution to less than about 109° C. to form sodium carbonate monohydrate crystals;
   (f) separating at least a portion of said sodium carbonate monohydrate crystals from said brine solution; and
   (g) drying said sodium carbonate monohydrate crystals to provide anhydrous sodium carbonate crystals.

19. The process of claim 18, further comprising the steps of:
   separating insoluble impurities from said liquid portion; and
   removing carbon dioxide from said liquid portion or said separated brine solution to provide a recycle solution.

20. The process of claim 19, wherein said recycle solution comprises lower sodium bicarbonate concentration than said brine solution.

* * * * *